M. M. DICKINSON.
DEVICE FOR COOKING ASPARAGUS.
APPLICATION FILED MAR. 13, 1909.
966,386.
Patented Aug. 2, 1910.
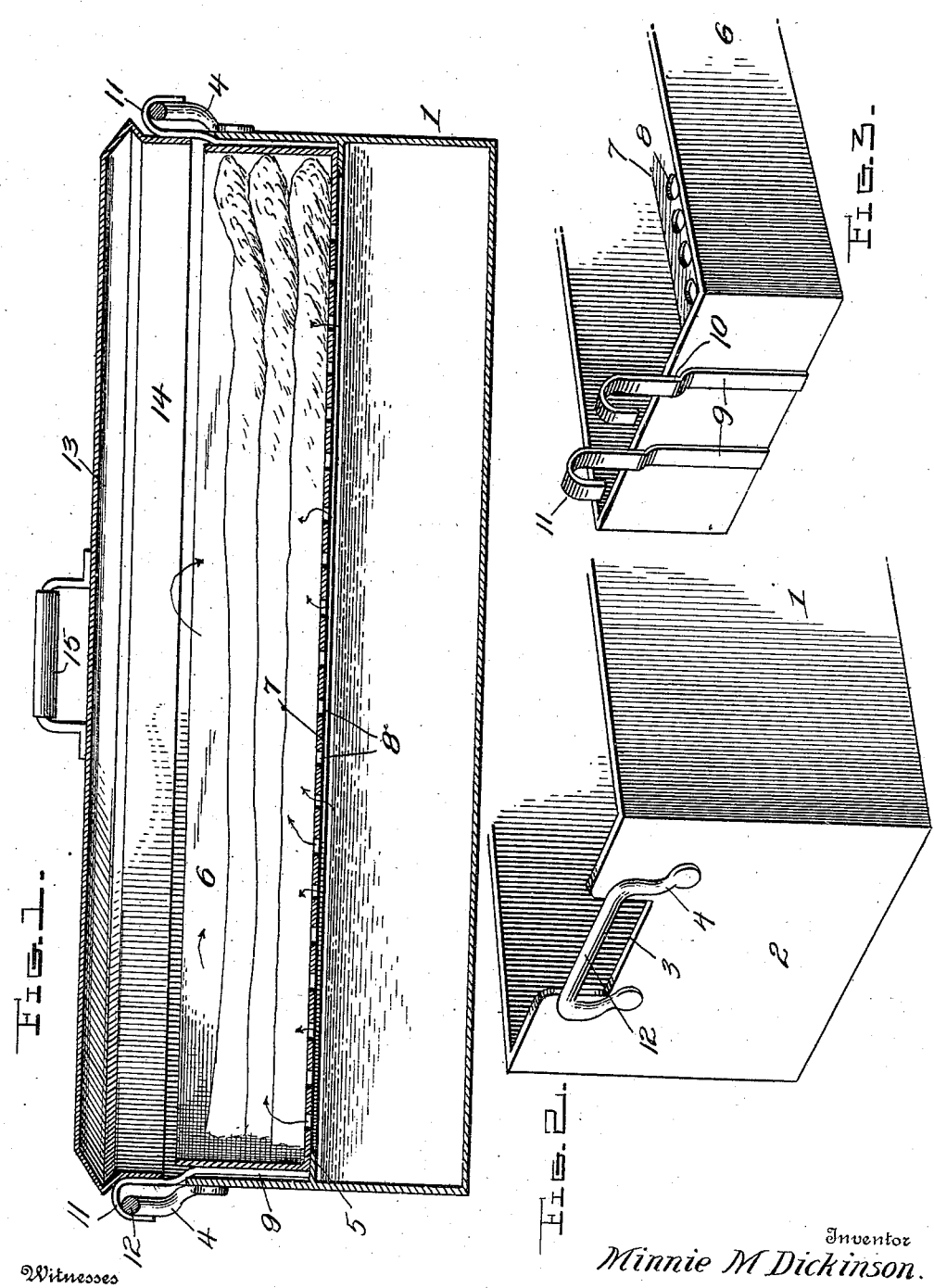
Witnesses
K. Allen
J. W. Garner
Inventor
Minnie M Dickinson.
By Victor J. Evans
Attorney
THE NORRIS PETERS CO., WASHINGTON, D. C.

UNITED STATES PATENT OFFICE.

MINNIE M. DICKINSON, OF EVANSTON, ILLINOIS.

DEVICE FOR COOKING ASPARAGUS.

966,386.      Specification of Letters Patent.      Patented Aug. 2, 1910.

Application filed March 13, 1909. Serial No. 483,189.

*To all whom it may concern:*

Be it known that I, MINNIE M. DICKINSON, a citizen of the United States, residing at Evanston, in the county of Cook and State of Illinois, have invented new and useful Improvements in Devices for Cooking Asparagus, of which the following is a specification.

This invention is an improved device for cooking asparagus and other foods and consists in the construction, combination and arrangement of devices hereinafter described and claimed.

The object of this invention is to provide an improved device of this character by means of which asparagus and other food articles may be steamed and served in an exceedingly attractive condition.

In the accompanying drawings:—Figure 1 is a perspective view of a cooking device constructed in accordance with this invention. Fig. 2 is a detail perspective view of one end of the outer vessel or boiler. Fig. 3 is a similar view of one end of the inner vessel or steamer.

In accordance with my invention, I provide an outer vessel 1 which constitutes a boiler and which is preferably of oblong rectangular form and is of suitable size to enable asparagus to be placed therein without the necessity of first cutting the asparagus in pieces. The end walls 2 of the outer vessel or boiler are provided at their upper edges with openings 3 and handles 4 are attached to the said end walls and are disposed opposite and are spaced from the said openings as indicated clearly in Figs. 1 and 2. At a suitable distance from its bottom, the said outer vessel or boiler is provided on its inner side with an inwardly extending ledge or flange 5 which extends entirely around the boiler and serves to support the inner vessel or steamer 6. Said inner vessel or steamer corresponds in shape with the outer vessel or boiler 1 but is slightly shorter and narrower than said outer vessel so that the said steamer may be placed on the ledge or supporting flange 5 and with its walls slightly spaced from those of the outer vessel as shown in Fig. 1.

The upper side of the steamer or inner vessel is open. The bottom 7 is provided with openings 8. On the end walls of said inner vessel or steamer are secured vertical bars 9, the upper ends of which are offset laterally as at 10 to lie in the common plane of the end walls of the outer vessel and in the openings 3, the extreme upper portions of said bars being bent outwardly and downwardly to form hooks 11 which engage and bear on the horizontal bar portions or bails 12 of the handles 4, said handles being of inverted U-shape. These hooks 11 by coaction with the handles 4 of the outer vessel serve to maintain the inner vessel or steamer in the outer vessel or boiler with its walls out of contact with those of said outer vessel or boiler so that steam from the latter gets between the walls of the inner and outer vessels as well as passing into the inner vessel through the openings 8. It will be understood that the asparagus to be cooked is placed lengthwise in the steamer or inner vessel and that during the cooking process it is subjected only to the action of the steam so that there is no necessity for cutting the asparagus into pieces nor does the asparagus become broken during the cooking process. Hence it may be readily cooked and served in an exceedingly attractive condition.

The outer vessel or boiler is provided with a cover 13 which has a depending flange 14 constituting portions of its four sides which depending flange fits within the outer vessel or boiler, its end and side wall portions bearing directly against the end and side walls of the boiler and moreover the end wall portions of said flange of the cover bear against the inner sides of the hooks 11 and extend across and nearly cover the openings 3. The cover 13 is provided with a handle 15.

What is claimed is:—

The herein described cooker comprising an outer vessel constituting a boiler and having openings in its end walls and handles on said end walls, said handles having horizontally disposed bars without and spaced from said end walls and disposed in planes lower than the upper edges of said end walls, an inner vessel or steamer having a perforated bottom and provided at its ends with inverted U-shaped hooks which extend upwardly and outwardly from the ends thereof, through the openings in the end walls of the boiler and engage over the horizontal bars of the said handles, and a cover for the boiler, having a depending flange bearing against the inner surface of the side and end walls of the boiler and also bearing against the inner sides of the said hooks and extending across and partially covering the said openings.

In testimony whereof I affix my signature in presence of two witnesses.

MINNIE M. DICKINSON.

Witnesses:
    D. E. HADLOCK,
    J. D. FINCH.